United States Patent [19]

Foster et al.

[11] 4,114,693

[45] Sep. 19, 1978

[54] METHOD OF TREATING FORMATION TO REMOVE AMMONIUM IONS WITHOUT DECREASING PERMEABILITY

[75] Inventors: William R. Foster, Dallas; Earl S. Snavely, Jr., Arlington, both of Tex.

[73] Assignee: Mobil Oil Corporation, New York, N.Y.

[21] Appl. No.: 824,686

[22] Filed: Aug. 15, 1977

[51] Int. Cl.$^2$ .................... E21B 43/27; E21B 43/28
[52] U.S. Cl. ................. 166/305 R; 166/274; 166/307; 299/4
[58] Field of Search .................. 166/271, 274, 305 R, 166/307; 299/3, 4, 5

[56] References Cited

U.S. PATENT DOCUMENTS

| | | | |
|---|---|---|---|
| 1,494,735 | 5/1924 | Cooper | 299/4 |
| 2,161,085 | 6/1939 | Phalen | 166/307 X |
| 2,679,294 | 5/1954 | Bond et al. | 166/307 X |
| 2,841,222 | 7/1958 | Smith | 166/305 R |
| 3,278,232 | 10/1966 | Fitch et al. | 299/4 |
| 3,796,264 | 3/1974 | Thigpen, Jr. | 166/305 R X |
| 3,880,237 | 4/1975 | Snavely, Jr. et al. | 166/271 X |
| 3,938,590 | 2/1976 | Redford et al. | 166/271 X |
| 4,031,959 | 6/1977 | Henderson | 166/307 |

OTHER PUBLICATIONS

Foster et al., "Some Aspects of the Structure and Rheology of Montmorillonite-Water-Electrolyte Systems," *The Mines Magazine,* Oct. 1955, pp. 152 et. sec.

*Primary Examiner*—Stephen J. Novosad
*Assistant Examiner*—George A. Suchfield
*Attorney, Agent, or Firm*—C. A. Huggett; Drude Faulconer

[57] ABSTRACT

A method of treating a subterranean formation which has undergone an in situ leaching operation which utilized an ammonium carbonate and/or bicarbonate lixiviant. In such a leach operation, ammonium ions will absorb into the clay in the formation and will present a threat of contamination to any ground waters that may be present in the formation. The present method involves flushing the formation with a strong, alkaline solution, e.g., sodium or calcium hydroxide, to convert the ammonium ions to ammonia which is easily carried from the formation by the alkaline solution. The alkaline solution is modified by adding a monovalent metal salt, e.g., sodium chloride, which prevents the clay from swelling which decreases the permeability of the formation. After substantially all of the ammonium ions are removed, the formation is then flushed with water to remove any alkaline solution which may remain in the formation.

8 Claims, 1 Drawing Figure

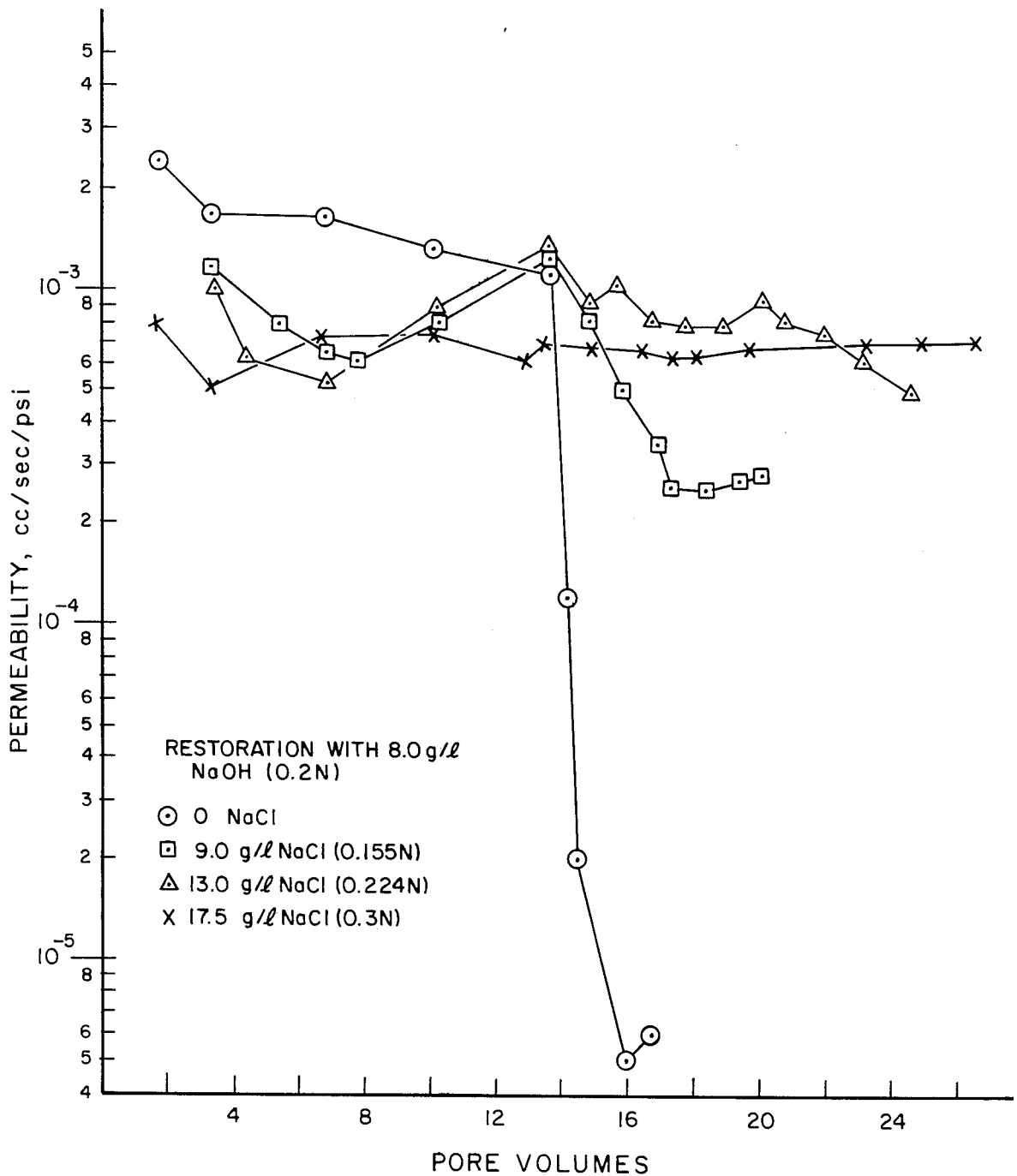

METHOD OF TREATING FORMATION TO REMOVE AMMONIUM IONS WITHOUT DECREASING PERMEABILITY

BACKGROUND OF THE INVENTION

The present invention relates to a method for restoring a subterranean formation which may have become contaminated during an in situ leach operation and more particularly relates to a method of removing contaminants from a subterranean clay-containing formation after an in situ leach operation to restore the purity of any ground waters that may be present in the formation.

In a typical in situ leach operation, wells are completed into a mineral or metal value bearing (e.g., uranium) formation and a lixiviant is flowed between wells to dissolve the desired values into the lixiviant. The pregnant lixiviant is produced to the surface where it is treated to recover the desired values from the lixiviant. Unfortunately, many known, highly effective lixiviants not only leach the desired values from the formation but, also, they react with certain formations to give up chemical substances which remain in the formation after the lixiviants pass therethrough. Where the formation also contains ground waters and/or a water source which would otherwise be fit for human and/or animal consumption, these chemical substances will likely create a substantial contamination problem for this water. If this be the case, the formation must be treated after a leach operation to remove these contaminants to restore the purity of the water.

One method for improving the purity of a contaminated water source is to merely pump the water from the formation until the contaminant reaches an acceptably low level. Another simple method is to pump uncontaminated water through the formation to flush out the contaminants. These methods work well where the contaminants are soluble and are not absorbed by some component of the formation from which it can only be released at a very slow rate. If the contaminants are absorbed by the formation, extremely large volumes of water must be used to adequately restore the formation.

In many known uranium and related value bearing formations, a substantial part of the formation matrix is comprised of swelling type clays (e.g., smectite). This type formation presents a real formation water contamination problem when a known, highly effective lixiviant comprised of an aqueous solution of ammonium carbonate and/or bicarbonate is used to leach the desired values from the formation. Here, the ammonium ions from the lixiviant are strongly absorbed by the smectite clays in the formation which make their removal by flushing with ground water a very slow and extended process.

One method for removing ammonium ions from a formation following a uranium leach operation is disclosed in copending U.S. application Ser. No. 781,242, filed Mar. 25, 1977, now U.S. Pat. No. 4,079,783, wherein an aqueous solution of a strong, soluble, alkaline compound is flowed through the formation to convert ammonium ions to an un-ionized form, i.e., ammonia ($NH_3$), which can easily be flushed from the formation. However, in certain instances, some of the more desirable alkaline solutions, e.g., sodium hydroxide, have a tendency to cause the clay in the formation to swell, which substantially decreases the permeability of the formation. If this swelling becomes severe enough, the restoration operation may have to be terminated before sufficient ammonium ions have been removed to adequately restore the formation.

SUMMARY OF THE INVENTION

The present invention provides a method of removing a contaminant, i.e., ammonium ions ($NH_4^+$), from a subterranean, clay-containing formation by flushing the formation with a modified alkaline solution which converts the ammonium ions to ammonia without swelling the clay and decreasing the permeability of the formation.

In leaching a formation containing smectite clay with an ammonium carbonate and/or bicarbonate lixiviant, ammonium ions are strongly absorbed into the clay and will slowly desorb into the ground waters in the formation, thereby contaminating same. In accordance with the present invention, after a leach operation has been completed, a modified aqueous solution of a strong, soluble, alkaline compound, e.g., sodium hydroxide, and a monovalent metal salt, e.g., sodium chloride, is flowed through the formation between the wells previously used during the leach operation. The alkaline soultion contacts the clay as it flows through the formation and converts the ammonium ions absorbed on the clays to ammonia which, in turn, is not strongly attracted to the clays. The ammonia will easily dissolve into the alkaline solution and will be carried thereby from the formation. The monovalent metal salt acts to prevent the clay from swelling so there is effectively no decrease in permeability in the formation during the restoration operation.

The chemical bases used in the present invention are soluble themselves and will not be absorbed by the clays during the flushing of the ammonium ions from the formation. This permits any alkaline solution remaining in the formation after substantially all of the ammonium ions have been removed to be easily displaced from the formation by flowing natural ground water therethrough. The actual operation and apparent advantages of the present invention will be better understood by referring to the following detailed description.

BRIEF DESCRIPTION OF THE DRAWING

The FIGURE is a graph showing experimental results representative of the effects of differing amounts of a salt, i.e., sodium chloride, added to an aqueous solution of sodium hydroxide on the permeability of a clay-bearing formation.

DESCRIPTION OF THE PREFERRED EMBODIMENT

In a typical in situ leach operation for recovering uranium and/or related values, wells are completed into a subterranean uranium or other value bearing formation and a lixiviant is flowed between the wells. The uranium and/or related values are dissolved into the lixiviant and are produced therewith to the surface where the pregnant lixiviant is treated to recover the desired values. For an example of such a leach operation, see U.S. patent application Ser. No. 712,404, filed Aug. 6, 1976, abandoned.

In many known formations where an in situ leach such as mentioned above is carried out, a substantial part of the formation matrix is comprised of swelling type clays (e.g., smectite). When a desired, highly effective lixiviant, i.e., ammonium carbonate and/or bicarbonate, is used in the leach operation, ammonium ions ($NH_4^+$) are strongly absorbed by the clays and remain in the formation after the leach operation is completed. These ammonium ions slowly dissolve into any ground water that may be present in the formation and thereby pose a contamination threat to the water source.

One method for removing the ammonium ions from the formation is disclosed in copending U.S. application Ser. No. 781,242, filed Mar. 25, 1977, now U.S. Pat. No. 4,079,783. The contaminated formation is flushed with an aqueous solution of a strong, soluble, alkaline compound to react with the ammonium ions on the clays to convert them to an un-ionized form, e.g., ammonia ($NH_3$). The ammonia is not strongly attracted to the clays and can easily be swept from the formation by the alkaline solution.

The alkaline solution is injected into one of the wells previously used in the leach operation and is produced from another until the ammonium ion concentration in the produced fluids drops below an accpetable level. When the ammonium ion concentration in the produced fluids reaches a desired low level, the injection of alkaline solution is stopped and the natural ground water, or the like, is injected to flush the alkaline solution from the formation. When the produced fluids indicate that substantially all of the alkaline solution has been flushed from the formation, injection of water is stopped and the restoration of the formation is completed. Another method for removing the alkaline solution is to pump both wells (formerly the injection well and producing well) until the surrounding ground water in the formation has displaced the alkaline solution.

The alkaline compounds to be used are selected on (1) their ability to convert the ammonium ions to ammonia, (2) their solubility in an aqueous solution, (3) their ability not to be absorbed by the clays, and (4) their availability and costs. Examples of suitable alkaline compounds are sodium hydroxide, calcium hydroxide, lithium hydroxide, and potassium hydroxide.

Unfortunately, some of these alkaline solutions when used in an economically dilute (less than 0.5N) solution have a tendency to react with the clay during the ion exchange to cause the clay to swell, thereby substantially decreasing the permeability of the formation. In some instances, the swelling may become so pronounced that the alkaline solution cannot flow between wells and the restoration operation may have to be stopped before the necessary amounts of ammonium ions have been displaced from the formation. This is especially true of sodium hydroxide which is a preferred solution since it is readily soluble in water, thereby requiring less volumes of solution to be injected to accomplish its objective.

In accordance with the present invention, a monovalent metal salt, e.g., sodium chloride or potassium chloride, is added to modify the aqueous alkaline solution before it is injected into the contaminated formation. The amount of salt to be added to a particular alkaline solution can be determined experimentally by taking core samples from the formation to be treated and flushing same with a selected alkaline solution having various concentrations of salt therein and noting the corresponding losses of permeability for each salt concentration. The modified alkaline solution is then injected into the formation to remove the ammonium ions in the same manner as described above but without any substantial swelling of the clay and decrease in permeability of the formation.

The effectiveness of the added salt in preventing clay swelling is shown by the graph in the figure which presents experimental results of the effects of an aqueous solution of sodium hydroxide having various amounts of salt (sodium chloride) on the permeability of a clay-containing formation. The relative permeability losses, (i.e., clay swelling) was obtained by flowing a sodium hydroxide solution containing various concentrations of sodium chloride through samples of formation material packed in Plexiglas tubes. Each of the formation samples had previously been saturated with 5000 ppm of ammonium bicarbonate ($NH_4HCO_3$) solution. In all experiments, the samples were composed of a mixture of cores taken from the same subterranean formation which was mostly siliceous with approximately twenty percent (20%) smectite clay therein. Results of the experiments are summarized below:

| Displacement Solution | Permeability loss (per cent) |
|---|---|
| 0.2N NaOH | 99.9 |
| 0.2N NaOH + 0.155N NaCl | 77.0 |
| 0.2N NaOH + 0.224N NaCl | 33.0 |
| 0.2N NaOH + 0.300N NaCl | 0.0 |

It can be seen that by adding salt to the aqueous solution of sodium hydroxide until the total $Na^+$ concentration reaches 0.5N, there is substantially no loss of permeability in the formation material.

What is claimed is:

1. A method of treating a subterranean clay-containing formation having ammonium ions absorbed in the clay, the method comprising:
    flushing said formation with an alkaline solution comprising:
        an aqueous solution of a strong, soluble, alkaline compound capable of converting the ammonium ions to ammonia; and
        a monovalent metal salt capable of preventing the swelling of said clay; and
    removing said ammonia from said formation.

2. The method of claim 1 wherein said strong, soluble, alkaline compound comprises:
    sodium hydroxide.

3. The method of claim 2 wherein said monovalent metal salt comprises:
    sodium chloride.

4. The method of claim 2 wherein said monovalent metal salt comprises:
    potassium chloride.

5. The method of claim 1 wherein said monovalent metal salt comprises:
    sodium chloride.

6. The method of claim 1 wherein said monovalent metal salt comprises:
    potassium chloride.

7. The method of claim 1 including:
    injecting water into said formation to flush said alkaline solution from said formation.

8. The method of claim 1 including:
    pumping fluids from all wells affected by the alkaline solution until the surrounding ground water displaces the alkaline solution.

* * * * *